(12) United States Patent
Wang et al.

(10) Patent No.: US 11,500,497 B2
(45) Date of Patent: Nov. 15, 2022

(54) TOUCH SUBSTRATE, PREPARATION METHOD AND DRIVING METHOD THEREOF, AND TOUCH DISPLAY PANEL

(71) Applicants: Chengdu BOE Optoelectronics Technology Co., Ltd., Sichuan (CN); BOE Technology Group Co., Ltd., Beijing (CN)

(72) Inventors: Yangpeng Wang, Beijing (CN); Zhenhua Zhang, Beijing (CN); Yuanyuan Chai, Beijing (CN); Xucong Wang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/254,863

(22) PCT Filed: Jun. 11, 2020

(86) PCT No.: PCT/CN2020/095643
§ 371 (c)(1),
(2) Date: Dec. 22, 2020

(87) PCT Pub. No.: WO2020/253617
PCT Pub. Date: Dec. 24, 2020

(65) Prior Publication Data
US 2021/0294461 A1    Sep. 23, 2021

(30) Foreign Application Priority Data

Jun. 20, 2019    (CN) .......................... 201910535236.8

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05); *G06F 2203/04103* (2013.01)

(58) Field of Classification Search
CPC .... G06F 3/0445; G06F 3/0412; G06F 3/0446; G06F 2203/04103; G06F 3/0416
See application file for complete search history.

(56) References Cited

U.S. PATENT DOCUMENTS

2014/0354902 A1    12/2014    Shih et al.
2017/0019522 A1*    1/2017    Kim .................. H04M 1/72439
(Continued)

FOREIGN PATENT DOCUMENTS

CN    104216543 A    12/2014
CN    106575180 A    4/2017
(Continued)

OTHER PUBLICATIONS

International Search Report for PCT/CN2020/095643 dated Sep. 11, 2020.

*Primary Examiner* — Md Saiful A Siddiqui
(74) *Attorney, Agent, or Firm* — Ling Wu; Stephen Yang; Ling and Yang Intellectual Property

(57) ABSTRACT

A touch substrate, a preparation method and a driving method thereof, and a touch display panel are provided. The touch substrate includes a planar part and at least a bending part. The bending part extends from an edge of the planar part and is bent to a side of the planar part. The planar part is provided with a main touch module having a double-layer electrode structure, and the bending part is provided with a side touch module having a single-layer electrode structure.

9 Claims, 11 Drawing Sheets

Detecting a touch signal of the main touch module and a touch signal of the side touch module — S10

Determining whether the planar part and the bending part are touched based on a change on the touch signal of the main touch module and the touch signal of the side touch module — S20

(56) References Cited

U.S. PATENT DOCUMENTS

2017/0192574 A1    7/2017  Koike et al.
2017/0371452 A1*  12/2017  Endo ..................... G06F 3/0446
2018/0188838 A1*   7/2018  An ......................... H01Q 7/00
2018/0253175 A1    9/2018  Yao
2020/0081562 A1*   3/2020  Shi ........................ G06F 3/0443

FOREIGN PATENT DOCUMENTS

| CN | 106816460 A    |   | 6/2017  |
|----|----------------|---|---------|
| CN | 108664158 A    |   | 10/2018 |
| CN | 110262691 A    |   | 9/2019  |
| EP | 3098696 A1     |   | 11/2016 |
| WO | WO 2018/120693 | * | 7/2018  |

* cited by examiner

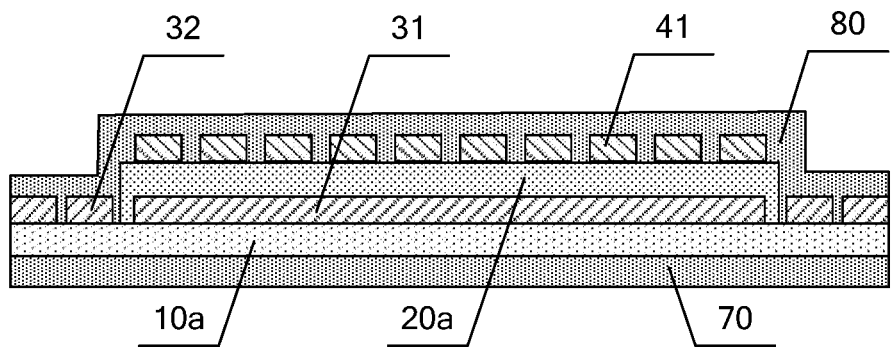

FIG. 24

Forming a planar part and at least a bending part, and bending the bending part from an edge of the planar part to a side of the planar part — S1

FIG. 25

Forming a planar part and a first bending part, or forming the planar part and a second bending part, or forming the planar part, the first bending part and the second bending part — S11

Bending the first bending part and/or the second bending part from the edge of the planar part to the side of the planar part — S12

FIG. 26

TOUCH SUBSTRATE, PREPARATION METHOD AND DRIVING METHOD THEREOF, AND TOUCH DISPLAY PANEL

CROSS-REFERENCE TO RELATED APPLICATIONS

The present application is a U.S. National Phase Entry of International Application No. PCT/CN2020/095643 having an international filing date of Jun. 11, 2020, which claims the priority of Chinese patent application No. 201910535236.8, filed to the CNIPA on Jun. 20, 2019 and titled "Touch Substrate, Preparation Method and Driving Method Thereof, and Touch Display Panel". The above-identified applications are incorporated herein by reference in their entirety.

TECHNICAL FIELD

Embodiments of the present disclosure relate to the field of touch technology, and in particular, to a touch substrate, a preparation method and a driving method thereof, and a touch display panel.

BACKGROUND

With the development of display technology, appearances of mobile terminals have changed unwittingly and rapidly, including changes from screens with press keys to large-size screens and further to touch screens, and also developing towards full screens. With the advent of a full-screen era, major panel manufacturers and terminal manufacturers continuously pursue a higher screen-to-body ratio. The screen-to-body ratio refers to a ratio of a projected area of a display region on the front to a projected area of a whole device.

In order to increase the screen-to-body ratio, various full-screen schemes are proposed in related technologies, including digging trenches or holes in a display panel, making a frame of the display panel transparent, bending the display panel and so on. Among them, the scheme of bending the display panel is a relatively simple and straightforward scheme, which has attracted a lot of attention.

As an important link in a process of human-computer interaction, at present a mobile terminal is usually equipped with a touch panel. Regardless of whether the touch panel has an ON-Cell structure disposed on the display panel or an IN-Cell structure disposed inside the display panel, the bending of the display panel needs to take the bending of the touch panel into consideration. In a current scheme of bending the display panel, it is mainly aimed at bending the display panel at one edge or two opposite edges of the display panel. It is difficult to achieve the bending of the display panel at two adjacent edges, three edges or even four edges of the display panel.

SUMMARY

The following is a summary of the subject matter described herein. This summary is not intended to limit a protection scope of the claims.

Embodiments of the present disclosure provide a touch substrate, a preparation method and a driving method thereof, and a touch display panel.

In a first aspect, an embodiment of the present disclosure provides a touch substrate, including a planar part and at least a bending part, wherein the bending part extends from an edge of the planar part and is bent to a side of the planar part, the planar part is provided with a main touch module having a double-layer electrode structure, and the bending part is provided with a side touch module having a single-layer electrode structure.

In some possible implementations, the bending part includes one or two first bending parts in a first direction and/or one or two second bending parts in a second direction, and the first direction and the second direction are perpendicular to each other.

In some possible implementations, the main touch module includes a first planar substrate, a first main electrode disposed on the first planar substrate, a second planar substrate disposed on the first main electrode and a second main electrode disposed on the second planar substrate; the first main electrode includes multiple strip electrodes extending along a first direction, and the multiple strip electrodes are sequentially disposed at intervals along a second direction; and the second main electrode includes a plurality of strip electrodes extending along the second direction, the plurality of strip electrodes are sequentially disposed at intervals along the first direction, and the first direction and the second direction are perpendicular to each other.

In some possible implementations, the side touch module includes a first bending substrate and a first side electrode disposed on the first bending substrate; the first bending substrate is disposed at an edge of the first planar substrate in the first direction and is bent to a side of the first planar substrate; and the first side electrode includes a first strip electrode extending along the second direction and a plurality of first block electrodes sequentially disposed at intervals along the second direction.

In some possible implementations, the first main electrode serves as a sensing electrode for a front touch, the plurality of first block electrodes of the first side electrode serve as sensing electrodes for a side touch, and the first strip electrode of the first side electrode serves as a driving electrode for the side touch.

In some possible implementations, the side touch module includes a second bending substrate and a second side electrode disposed on the second bending substrate; the second bending substrate is disposed at an edge of the second planar substrate in the second direction and bent to a side of the second planar substrate; and the second side electrode includes a second strip electrode extending along the first direction and a plurality of second block electrodes sequentially disposed at intervals along the first direction.

In some possible implementations, the second main electrode serves as a driving electrode for the front touch, the plurality of second block electrodes of the second side electrode serve as driving electrodes for the side touch, and the second strip electrode of the second side electrode serves as a sensing electrode for the side touch.

In a second aspect, an embodiment of the present disclosure further provides a preparation method of a touch substrate, including: forming a planar part and at least a bending part, and bending the bending part from an edge of the planar part to a side of the planar part, wherein the planar part is provided with a main touch module having a double-layer electrode structure, and the bending part is provided with a side touch module having a single-layer electrode structure.

In some possible implementations, forming the planar part and at least the bending part, and bending the bending part from the edge of the planar part to the side of the planar part, includes: forming the planar part and a first bending part, or forming the planar part and a second bending part, or forming the planar part, the first bending part and the second bending part, wherein there is one or two first bending parts, located at an edge(s) of the planar part in a first direction, there is one or two second bending parts located at an edge(s) of the planar part in a second direction, and the first direction and the second direction are perpendicular to each other; and bending the first bending part and/or the second bending part from the edge of the planar part to the side of the planar part.

In some possible implementations, forming the planar part and at least the bending part, and bending the bending part from the edge of the planar part to the side of the planar part, includes: forming a first electrode on a first substrate, wherein the first substrate includes a first planar substrate and a first bending substrate, and the first bending substrate is disposed at an edge of the first planar substrate in a first direction; forming a second substrate on the first electrode, wherein the second substrate includes a second planar substrate and a second bending substrate, the second bending substrate is disposed at an edge of the second planar substrate in a second direction, and the first direction and the second direction are perpendicular to each other; forming a second electrode on the second substrate; and bending the first bending substrate from the edge of the first planar substrate in the first direction to a side of the first planar substrate, and bending the second bending substrate from the edge of the second planar substrate in the second direction to a side of the second planar substrate.

In some possible implementations, forming the first electrode on the first substrate includes: forming a first main electrode on the first planar substrate, and forming a first side electrode on the first bending substrate, wherein the first main electrode includes a plurality of strip electrodes extending along the first direction, the plurality of strip electrodes are sequentially disposed at intervals along the second direction and serve as sensing electrodes of the main touch module for a front touch, the first side electrode includes a first strip electrode extending along the second direction and a plurality of first block electrodes sequentially disposed at intervals along the second direction, the plurality of first block electrodes serve as sensing electrodes of the side touch module for a side touch, and the first strip electrode serves a driving electrode of the side touch module for the side touch.

In some possible implementations, forming the second electrode on the second substrate includes: forming a second main electrode on the second planar substrate, and forming a second side electrode on the second bending substrate, wherein the second main electrode includes a plurality of strip electrodes extending along the second direction, the plurality of strip electrodes are sequentially disposed at intervals along the first direction and serve as driving electrodes of the main touch module for a front touch, the second side electrode includes a second strip electrode extending along the first direction and a plurality of second block electrodes sequentially disposed at intervals along the first direction, the plurality of second block electrodes serve as driving electrodes of the side touch module for a side touch, and the second strip electrode serves as a sensing electrode of the side touch module for the side touch.

In a third aspect, an embodiment of the present disclosure further provides a touch display device including a display panel and the touch substrate described above, wherein the touch substrate is disposed on the display panel, or the touch substrate is disposed in the display panel.

In a fourth aspect, an embodiment of the present disclosure further provides a driving method of a touch substrate, wherein the touch substrate includes a planar part and at least a bending part, the bending part extends from an edge of the planar part and is bent to a side of the planar part, the planar part is provided with a main touch module having a double-layer electrode structure, and the bending part is provided with a side touch module having a single-layer electrode structure, the driving method including: detecting a touch signal of the main touch module and a touch signal of the side touch module; and determining whether the planar part and the bending part are touched based on a change on the touch signal of the main touch module and the touch signal of the side touch module.

In some possible implementations, the main touch module includes a main sensing electrode disposed on a first planar substrate and a main driving electrode disposed on a second planar substrate; the side touch module includes an upper first side electrode and a lower first side electrode disposed on a first bending substrate and a left second side electrode and a right second side electrode disposed on a second bending substrate; the first bending substrate extends from an upper edge of the first planar substrate and is bent to an upper side of the first planar substrate, and extends from a lower edge of the first planar substrate and is bent to a lower side of the first planar substrate; the second bending substrate extends from a left edge of the second planar substrate and is bent to a left side of the second planar substrate, and extends from a right edge of the second planar substrate and is bent to a right side of the second planar substrate; the upper first side electrode includes an upper sensing electrode and an upper driving electrode, and the upper sensing electrode is connected with the main sensing electrode; the lower first side electrode includes a lower sensing electrode and a lower driving electrode, and the lower sensing electrode is connected with the main sensing electrode; the left second side electrode includes a left driving electrode and a left sensing electrode, and the left driving electrode is connected with the main driving electrode; and the right second side electrode includes a right driving electrode and a right sensing electrode, and the right driving electrode is connected with the main driving electrode.

In some possible implementations, detecting the touch signal of the main touch module and the touch signal of the side touch module includes: detecting a sensing signal Rx of the main sensing electrode, a driving signal Tx of the main driving electrode, an upper driving signal Tu of the upper driving electrode, a lower driving signal Td of the lower driving electrode, a left sensing signal Rl of the left sensing electrode and a right sensing signal Rr of the right sensing electrode.

In some possible implementations, determining whether the planar part and the bending part are touched based on the change on the touch signal of the main touch module and the touch signal of the side touch module includes: in response to detecting that the sensing signal Rx and the driving signal Tx are changed while the upper driving signal Tu, the lower driving signal Td, the left sensing signal Rl and the right sensing signal Rr are not changed, determining that the planar part is touched; in response to detecting that the driving signal Tx and the left sensing signal Rl are changed while the sensing signal Rx is not changed, determining that the bending part on a left side of the planar part is touched; in response to detecting that the driving signal Tx and the right sensing signal Rr are changed while the sensing signal Rx is not changed, determining that the bending part on a right side of the planar part is touched; in response to detecting that the sensing signal Rx and the upper driving signal Tu are changed while the driving signal Tx is not changed, determining that the bending part on an upper side of the planar part is touched; in response to detecting that the sensing signal Rx and the lower driving signal Td are changed while the driving signal Tx is not changed, determining that the bending part on a lower side of the planar part is touched; and in response to detecting that the sensing signal Rx, the driving signal Tx, the upper driving signal Tu, the lower driving signal Td, the left sensing signal Rl and the right sensing signal Rr are changed, determining that the planar part and the bending part on all sides are touched.

Other features and advantages of the present disclosure will be set forth in the following embodiments of the description. Purposes and other advantages of the technical schemes of the present disclosure may be achieved and acquired by structures specified in the detailed description, claims and drawings.

Other aspects will become apparent upon reading and understanding accompanying drawings and the detailed description.

BRIEF DESCRIPTION OF DRAWINGS

The attached drawings are used to provide a further understanding of the technical scheme of the present disclosure, and constitute a part of the specification. They are used together with the embodiments of the present application to explain the technical scheme of the present disclosure, and do not constitute a restriction on the technical scheme of the present disclosure. Shapes and sizes of the components in the drawings do not reflect true proportions, and the purpose is only for schematically illustrating contents of the present disclosure.

FIG. 24 is a schematic diagram showing a formation of an encapsulation layer according to yet another exemplary embodiment of the present disclosure;

FIG. 25 is a flowchart of a preparation method of a touch substrate according to an exemplary embodiment of the present disclosure;

FIG. 26 is a flowchart illustrating an implementation of a step S1 in the preparation method of the touch substrate according to an exemplary embodiment of the present disclosure;

DETAILED DESCRIPTION

Figure 1:
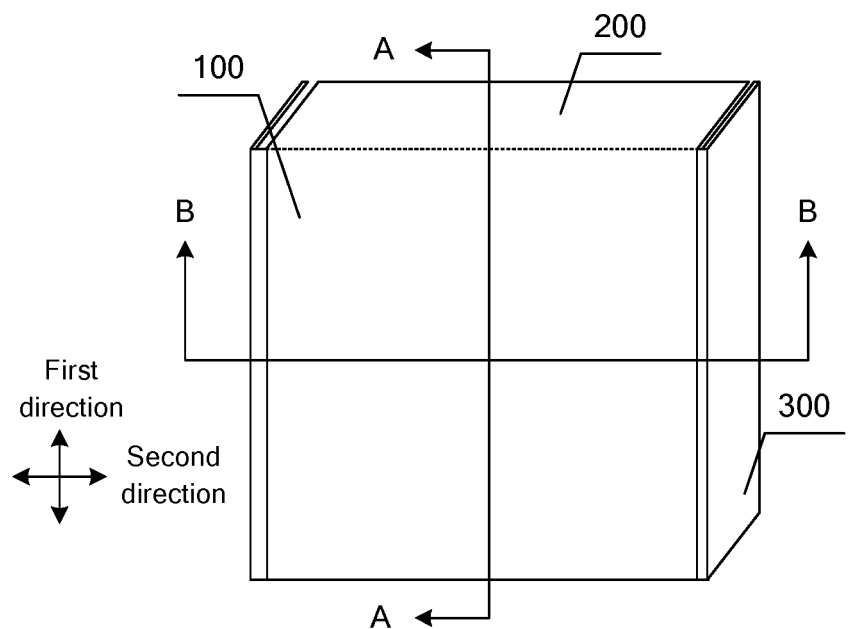
FIG. 1 is a schematic structural diagram of a touch substrate according to an exemplary embodiment of the present disclosure.

Specific implementations of the present disclosure will be described in further detail below with reference to the accompanying drawings and embodiments. The following embodiments are used to illustrate the technical schemes of the present disclosure, but are not used to limit the scope of the present disclosure. Without conflict, embodiments in the present disclosure and features in the embodiments may be combined with each other arbitrarily.

In an existing scheme of bending a display panel, it is difficult to bend the display panel at two adjacent edges, three edges or even four edges of the display panel. A main reason is that bending the display panel at multiple edges may cause wrinkles in corner areas of the touch panel. The wrinkles may not only affect a touch effect and reliability of the corner areas, but also increase a design complexity of the touch panel as well as difficulty in a preparation process of the touch panel.

An ON-Cell type touch panel and an IN-Cell type touch panel usually adopt capacitive technologies, including mutual capacitance touch technology and self-capacitance touch technology. The mutual capacitance touch technology determines a touch event mainly by detecting a change on a coupling capacitance produced by static electricity of a touch object and a touch unit when the touch object is adjacent to or in contact with the touch unit on the touch panel. Because the mutual capacitance touch technology has advantages such as a high accuracy, a multi-point touch, a high durability and a high touch resolution, etc., the mutual capacitance touch technology has become a mainstream touch technology used in the industry. In terms of a structural design, the mutual capacitance touch technology can be divided into two types including a single-layer electrode structure and a double-layer electrode structure. A main characteristic of the single-layer electrode structure includes that driving electrodes and sensing electrodes of the touch panel are disposed on the same layer, a strip sensing electrode corresponds to a plurality of block driving electrodes, and each driving electrode generates a coupling capacitance with the sensing electrode to form a touch unit, which is also referred to as a single-layer mutual capacitance structure. A main characteristic of the double-layer electrode structure includes that driving electrodes and sensing electrodes of the touch panel are disposed in different layers, and a plurality of strip sensing electrodes intersect with a plurality of strip driving electrodes to form touch units, which is also referred to as a double-layer mutual capacitance structure.

Embodiments of the disclosure provide a touch substrate that adopts a combined electrode structure. A structure of the touch substrate in embodiments of the disclosure includes a planar part and at least a bending part. The bending part extends from an edge of the planar part and is bent to a side of the planar part. The planar part is provided with a main touch module with a double-layer electrode structure, and the bending part is provided with a side touch module with a single-layer electrode structure. The double-layer electrode structure refers to a double-layer mutual capacitance structure, where a driving electrode and a sensing electrode are disposed in different layers. The single-layer electrode structure refers to a single-layer mutual capacitance structure, where a driving electrode and a sensing electrode are disposed in the same layer.

Embodiments of the present disclosure provide a touch substrate. A touch module of the touch substrate adopts a combined electrode structure including a double-layer electrode structure and a single-layer electrode structure. That is, a main touch module of a planar part adopts a double-layer electrode structure, and a side touch module of a bending part adopts a single-layer electrode structure. This can eliminate corner wrinkles caused by the bending at corner areas, accomplish the bending at two adjacent edges, three edges or four edges, ensure the touch effect and reliability of the corner areas, and maximally reduce a design complexity and difficulty in a preparation process of the touch substrate. Of course, an implementation of any product or method in the embodiments of the present disclosure does not need to achieve all the advantages mentioned above at the same time.

Figure 2:
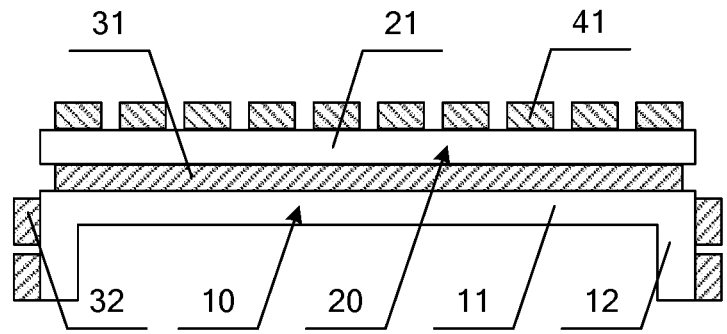
FIG. 2 is a sectional view taken along an A-A direction in FIG. 1.
Figure 3:
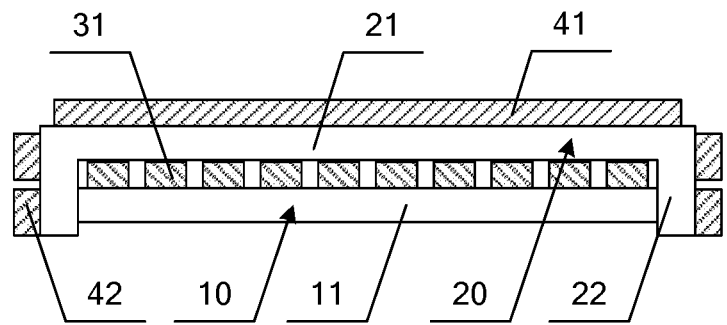
FIG. 3 is a sectional view taken along a B-B direction in FIG. 1.

FIG. 1 is a schematic structural diagram of a touch substrate according to an exemplary embodiment of the present disclosure, FIG. 2 is a sectional view taken along an A-A direction in FIG. 1, and FIG. 3 is a sectional view taken along a B-B direction in FIG. 1. As shown in FIG. 1, on a plane parallel to the touch substrate, the structure of the touch substrate in the embodiment includes a planar part 100, two first bending parts 200 that are disposed oppositely in a first direction and two second bending parts 300 that are disposed oppositely in a second direction. The first bending parts 200 and the second bending parts 300 extend from edges of the planar part 100 and are bent to sides of the planar part 100. A first edge where a first bending part 200 is located is adjacent to a second edge where a second bending part 300 is located. The first direction and the second direction are perpendicular to each other.

As shown in FIGS. 2 and 3, on a plane perpendicular to the touch substrate, the touch substrate in the embodiment includes a first substrate, a first electrode, a second substrate and a second electrode. In the first direction, the first substrate 10 includes a first planar substrate 11 and two first bending substrates 12 that are disposed oppositely. The first bending substrates 12 extend from edges of the first planar substrate 11 and are bent to sides of the first planar substrate 11. In the second direction, the first substrate 10 only includes the first planar substrate 11. The first electrode includes a first main electrode 31 disposed on the first planar substrate 11 and a first side electrode 32 disposed on the first bending substrate 12. The first main electrode 31 is a strip electrode extending along the first direction, and multiple strip electrodes are sequentially disposed at intervals along the second direction. In the first direction, the second substrate 20 only includes a second planar substrate 21 disposed on the first main electrode 31. In the second direction, the second substrate 20 includes the second planar substrate 21 disposed on the first main electrode 31 and two second bending substrates 22 that are disposed oppositely. The second bending substrates 22 extend from edges of the second planar substrate 21 and are bent to sides of the second planar substrate 21. The second electrode includes a second main electrode 41 disposed on the second planar substrate 21 and a second side electrode 42 disposed on the second bending substrate 22. The second main electrode 41 is a strip electrode extending along the second direction, and multiple strip electrodes are sequentially disposed at intervals along the first direction.

Figure 4:
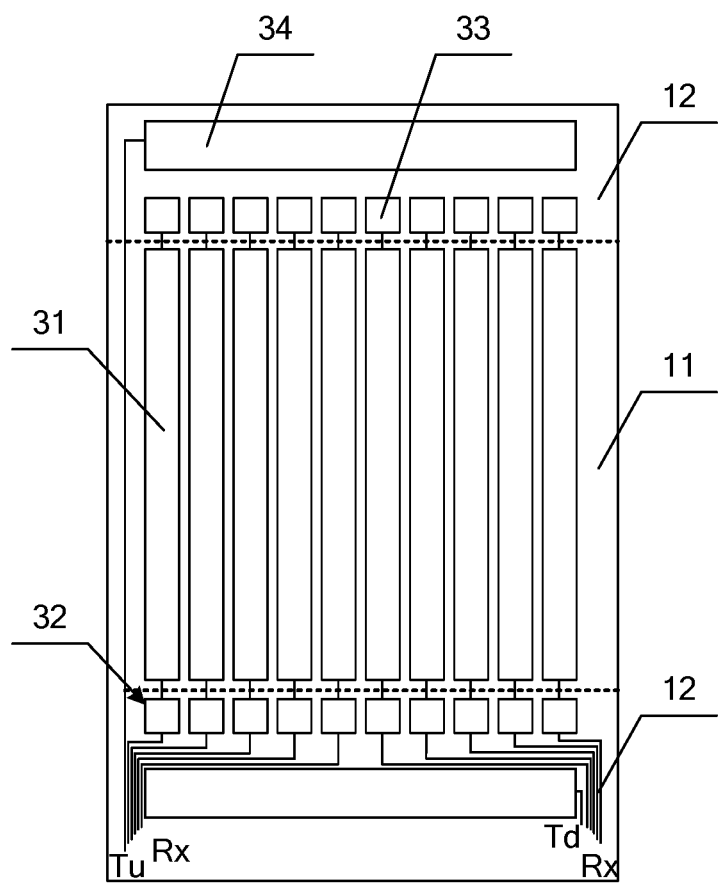
FIG. 4 is a schematic structural diagram of a first electrode disposed on a first substrate according to an exemplary embodiment of the present disclosure.

FIG. 4 is a schematic structural diagram of a first electrode disposed on a first substrate according to an exemplary embodiment of the present disclosure. The first substrate includes the first planar substrate 11 and the first bending substrates 12 located at two edges of the first planar substrate 11 in the first direction. For the sake of clarity, in FIG. 4, the two first bending substrates 12 are not bent and are in the same plane as the first planar substrate 11, and dashed lines between the first planar substrate 11 and the first bending substrates 12 are bending lines. As shown in FIG. 4, the first electrode includes the first main electrode 31 disposed on the first planar substrate 11 and the first side electrodes 32 disposed on the first bending substrates 12. The first main electrode 31 is a strip electrode extending along the first direction, and multiple strip electrodes are sequentially disposed at intervals along the second direction, which serve as sensing (Rx) electrodes of the main touch module for a front touch and receive Rx signals. The first side electrode 32 includes a first block electrode 33 and a first strip electrode 34. Multiple first block electrodes 33 are sequentially disposed at intervals along the second direction. Each first block electrode 33 is placed corresponding to a first main electrode 31 in position and is connected with the first main electrode 31. Multiple first block electrodes 33 serve as sensing electrodes of the side touch module for a side touch, and receive Rx signals. The first strip electrode 34 is a strip electrode extending along the second direction, is disposed on a side of the multiple first block electrodes 33, serves as a driving (Tx) electrode of the side touch module for the side touch, and receives a Tx signal. According to a configuration manner of the touch substrate in FIG. 1, the first direction refers to a vertical direction, and the two first side electrodes may be referred to as an upper first side electrode and a lower first side electrode. The upper first side electrode includes an upper sensing electrode and an upper driving electrode. The upper sensing electrode receives a Rx signal, and the upper driving electrode receives an upper driving signal (Tu). The lower first side electrode includes a lower sensing electrode and a lower driving electrode. The lower sensing electrode receives a Rx signal, and the lower driving electrode receives a lower driving signal (Td).

Figure 5:
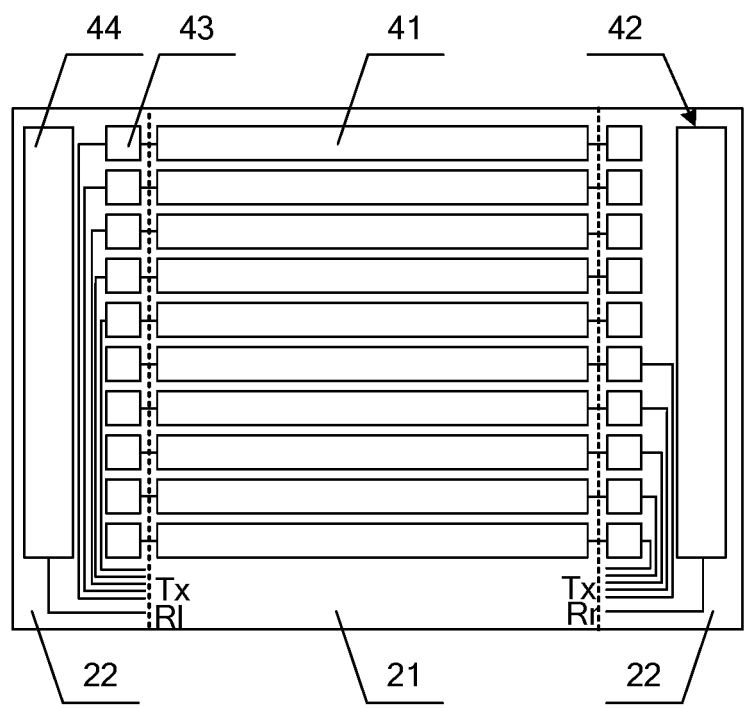
FIG. 5 is a schematic structural diagram of a second electrode disposed on a second substrate according to an exemplary embodiment of the present disclosure.

FIG. 5 is a schematic structural diagram of a second electrode disposed on a second substrate according to an exemplary embodiment of the present disclosure. The second substrate includes the second planar substrate 21 and the second bending substrates 22 located at two edges of the second planar substrate 21 in the second direction. For the sake of clarity, in FIG. 5, the two second bending substrates 22 are not bent and are in the same plane as the second planar substrate 21, and dashed lines between the second planar substrate 21 and the second bending substrates 22 are bending lines. As shown in FIG. 5, the second electrode includes the second main electrode 41 disposed on the second planar substrate 21 and the second side electrodes 42 disposed on the second bending substrates 22. The second main electrode 41 is a strip electrode extending along the second direction, and multiple strip electrodes are sequentially disposed at intervals along the first direction, which serve as driving (Tx) electrodes of the main touch module for the front touch and receive Tx signals. The second side electrode 42 includes a second block electrode 43 and a second strip electrode 44. Multiple second block electrodes 43 are sequentially disposed at intervals along the first direction. Each second block electrode 43 is placed corresponding to a second main electrode 41 in position and is connected with the second main electrode 41. The multiple second block electrodes 43 serve as driving electrodes of the side touch module for the side touch, and receive Tx signals. The second strip electrode 44 is a strip electrode extending along the first direction, is disposed on a side of the multiple second block electrodes 43, serves as a sensing electrode of the side touch module for the side touch, and receives a Rx signal. According to the configuration manner of the touch substrate in FIG. 1, the second direction refers to a horizontal direction, and the two second side electrodes may be referred to as a left second side electrode and a right second side electrode. The left second side electrode includes a left driving electrode and a left sensing electrode. The left driving electrode receives a Tx signal, and the left sensing electrode receives a left sensing signal (Rl). The right second side electrode includes a right driving electrode and a right sensing electrode. The right driving electrode receives a Tx signal, and the right sensing electrode receives a right sensing signal (Rr).

As shown in FIGS. 1-5, through a differential design of the first substrate and the second substrate in the embodiment, corner wrinkles caused by the bending at corner areas can be eliminated, and the bending at two adjacent edges, three edges or four edges can be achieved. In the embodiment, the first substrate is designed to be bent in the first (up and down) direction, and the second substrate is designed to be bent in the second (left and right) direction. Since two adjacent bending edges of the touch substrate come from different substrates, wrinkles may not be produced at a corner area formed by the two bending edges. As a result, the bending at two adjacent edges, three edges or four edges can be accomplished, and the design complexity and difficulty in a preparation process of the touch substrate can be reduced maximally.

As shown in FIGS. 1-5, through a differential design of the first electrode and the second electrode in the embodiment, the touch effect and reliability of the side areas and the corner areas are ensured. For a touch substrate that bends at four sides, touch demand on the upper, lower, left and right sides is finite, and touch performance on the sides does not need to be completely consistent with that on the front display. Therefore, the front touch and the side touch of the touch substrate are designed differently in the embodiment. The front touch adopts a double-layer mutual capacitance structure, including the first main electrode 31 on the first planar substrate 11 and the second main electrode 41 on the second planar substrate 21. The first main electrode 31 and the second main electrode 41 together constitute a main touch module. The side touch adopts a single-layer mutual capacitance structure, including the first side electrode 32 on the first bending substrate 12 and the second side electrode 42 on the second bending substrate 22. The first side electrode 32 may constitute a side touch module, and the second side electrode 42 may constitute a side touch module. Since each bending side has a single-layer mutual capacitance structure in the embodiment, needed touch units can be formed at the bending side itself, and its touch performance is not affected by the other bending sides. As a result, the touch effect and reliability of the side areas and the corner areas are ensured, and the design complexity and difficulty in the preparation process of the touch substrate are reduced greatly. In an exemplary embodiment, the sensing electrode for the front touch, the sensing electrodes for the upper-side touch and the lower-side touch, and the driving electrodes for the upper-side touch and the lower-side touch are disposed on a first layer. The driving electrode for the front touch, the driving electrodes for the left-side touch and the right-side touch, and the sensing electrodes for the left-side touch and the right-side touch are disposed on a second layer. Of course, in other embodiments, the electrodes disposed in the first layer and the second layer may be interchanged.

The following illustrates the technical scheme of the embodiments by providing a preparation process of the touch substrate. A "patterning process" mentioned in the embodiment includes processes, such as a film layer deposition, a photoresist coating, a mask exposure, a development, an etching, and a photoresist stripping, etc. Processes such as a sputtering, an evaporation, a chemical vapor deposition may be used for deposition.

Figure 6:
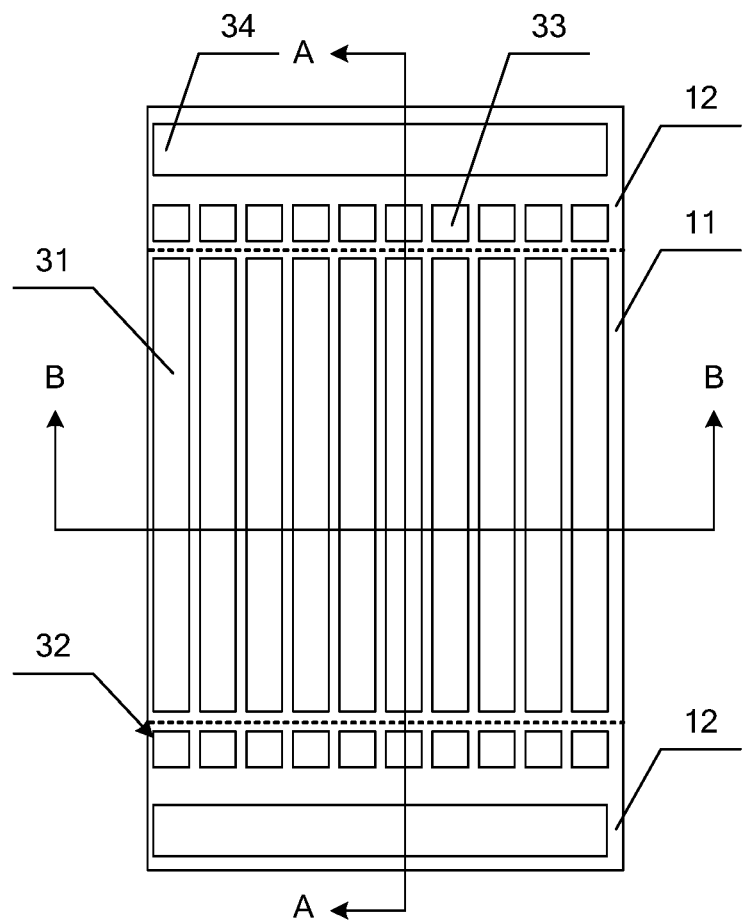
FIG. 6 is a schematic diagram after a pattern of a first electrode is formed according to an exemplary embodiment of the present disclosure.
Figure 7:
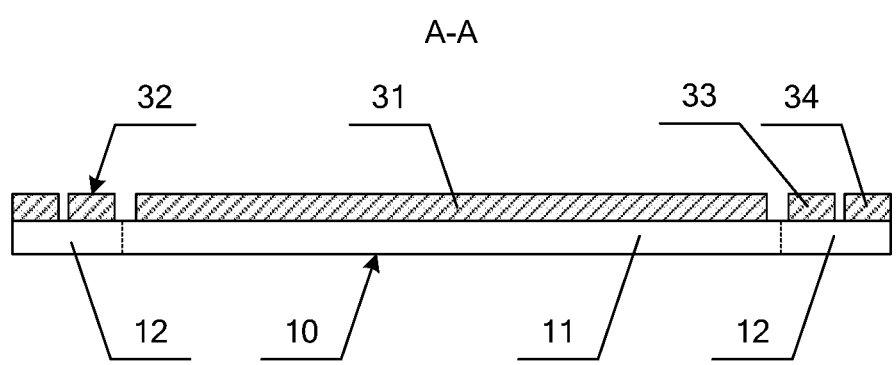
FIG. 7 is a sectional view taken along an A-A direction in FIG. 6.
Figure 8:
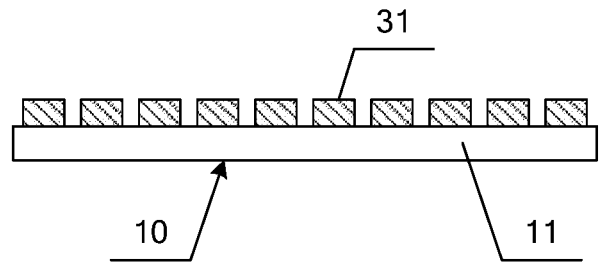
FIG. 8 is a sectional view taken along a B-B direction in FIG. 6.

(1) A pattern of a first electrode is formed. A formation of the pattern of the first electrode may include: depositing a first metal film on the first substrate 10, coating a layer of photoresist on the first metal film, exposing and developing the photoresist with a single tone mask, forming an unexposed area and retaining the photoresist at a position of the pattern of the first electrode, forming a fully exposed area and removing the photoresist at other positions, etching the first metal film at the fully exposed area and stripping the remaining photoresist to form the pattern of the first electrode. As shown in FIGS. 6, 7 and 8, FIG. 6 is a schematic diagram after the pattern of the first electrode is formed according to an exemplary embodiment of the present disclosure, FIG. 7 is a sectional view taken along an A-A direction in FIG. 6, and FIG. 8 is a sectional view taken along a B-B direction in FIG. 6. The first substrate 10 includes a first planar substrate 11 and two first bending substrates 12. In the first direction, the two first bending substrates 12 are respectively disposed at edges (upper and lower sides) of the first planar substrate 11. The first electrode includes the first main electrode 31 and the first side electrode 32. The first main electrode 31 is located on the first planar substrate 11. The first side electrode 32 is located on the first bending substrate 12. The first side electrode 32 includes the first block electrode 33 and the first strip electrode 34.

Figure 9:
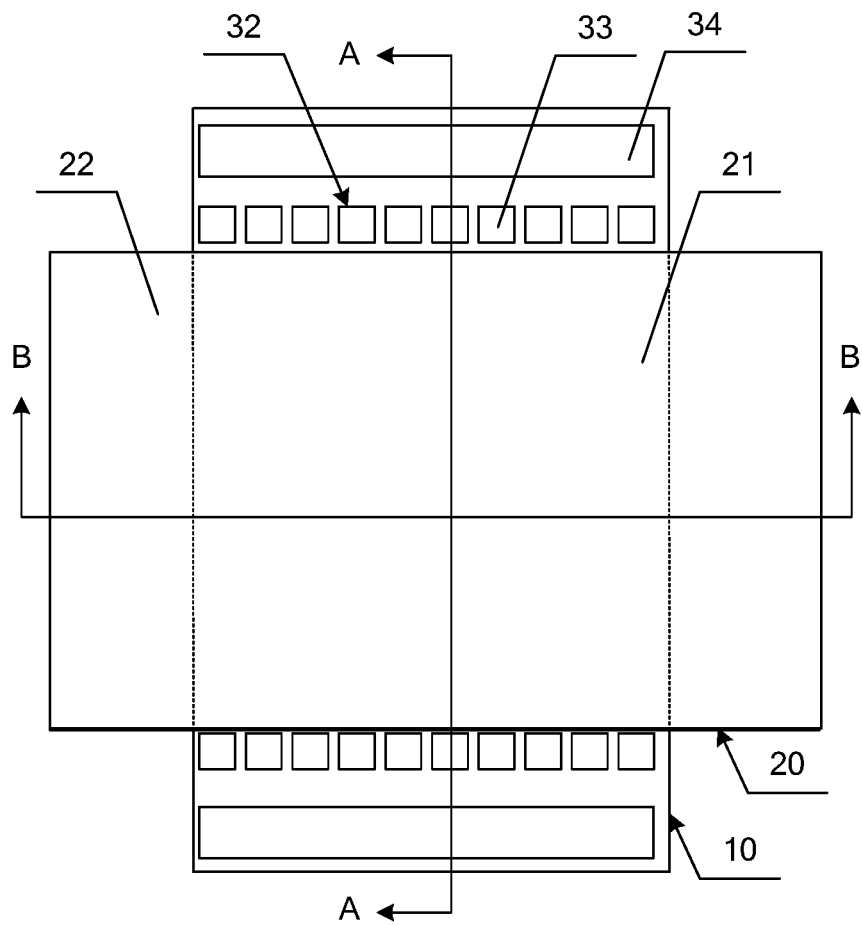
FIG. 9 is a schematic diagram after a second substrate is formed according to an exemplary embodiment of the present disclosure.
Figure 10:
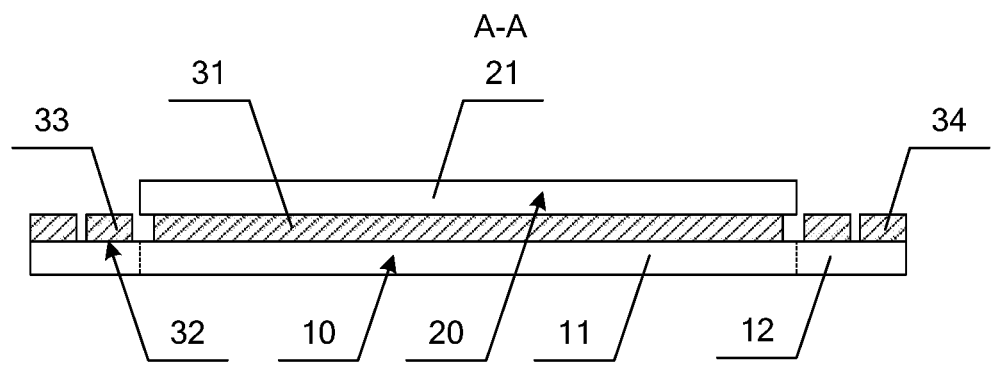
FIG. 10 is a sectional view taken along an A-A direction in FIG. 9.
Figure 11:
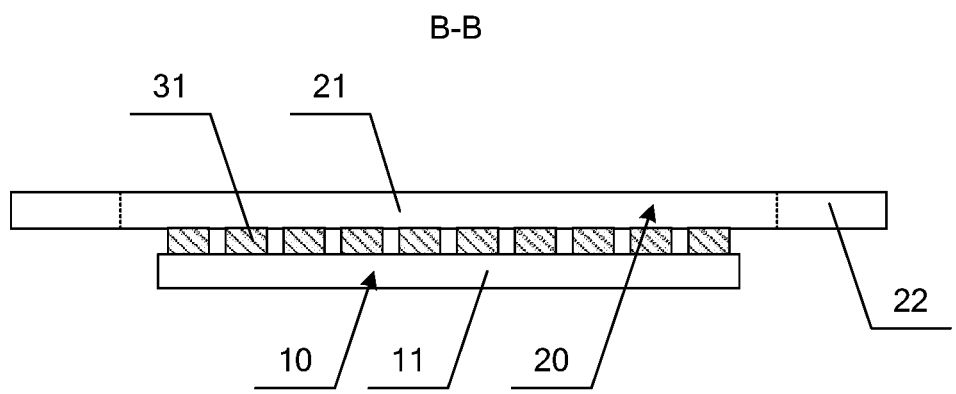
FIG. 11 is a sectional view taken along a B-B direction in FIG. 9.

(2) A second substrate is formed. A formation of the second substrate may include: attaching the second substrate 20 to the first substrate on which the pattern of the first electrode is formed. The second substrate 20 includes the second planar substrate 21 and two second bending substrates 22. The two second bending substrates 22 are respectively disposed at edges (left and right sides) of the second planar substrate 21 in the second direction. As shown in FIGS. 9, 10 and 11, FIG. 9 is a schematic diagram after the second substrate is formed according to an exemplary embodiment of the present disclosure, FIG. 10 is a sectional view taken along an A-A direction in FIG. 9, and FIG. 11 is a sectional view taken along a B-B direction in FIG. 9.

Figure 13:
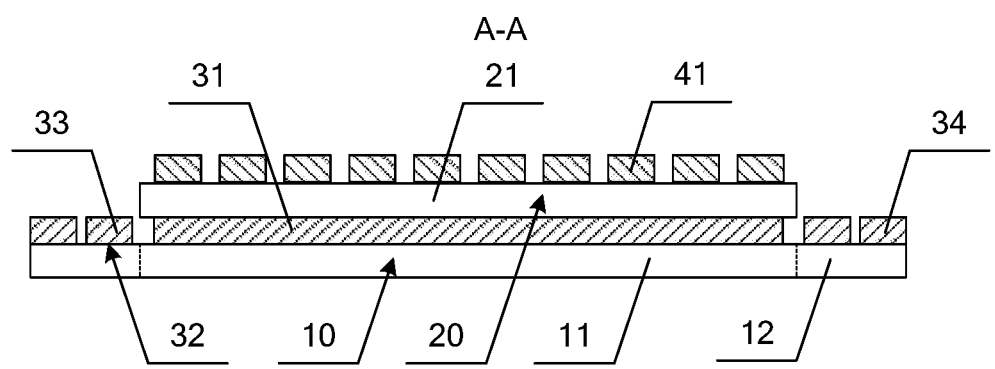
FIG. 13 is a sectional view taken along an A-A direction in FIG. 12.
Figure 12:
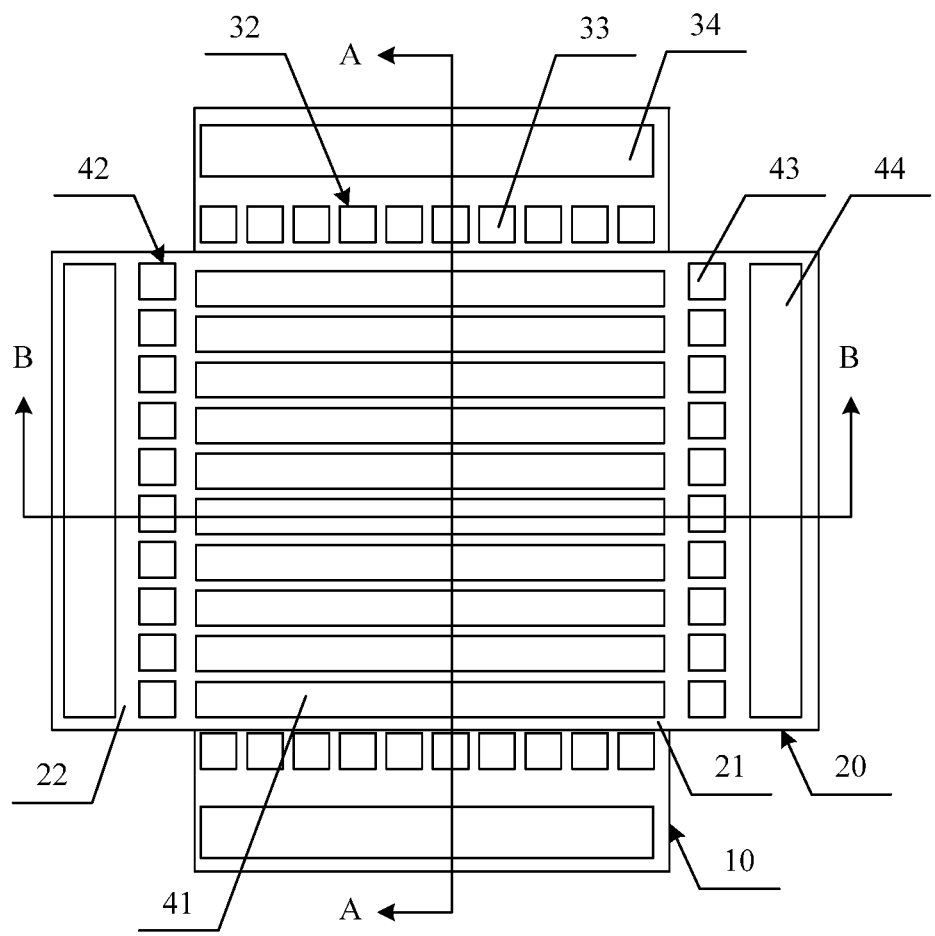
FIG. 12 is a schematic diagram after a pattern of a second electrode is formed according to an exemplary embodiment of the present disclosure.
Figure 14:
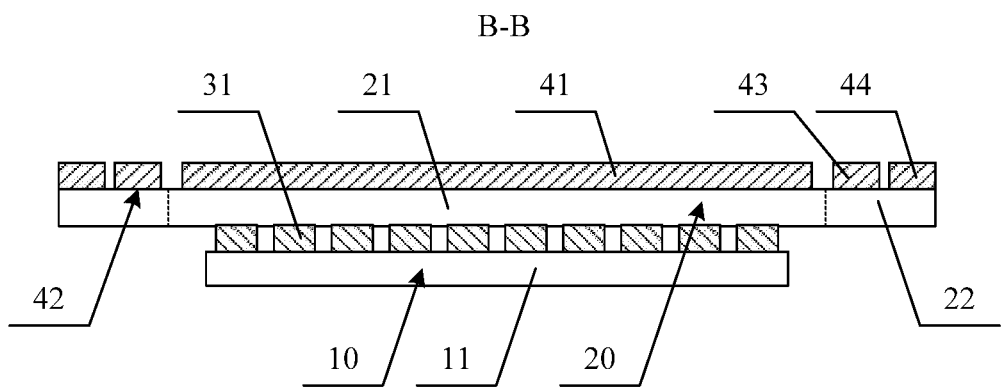
FIG. 14 is a sectional view taken along a B-B direction in FIG. 12.

(3) A pattern of a second electrode is formed. A formation of the pattern of the second electrode may include: depositing a second metal film on the second substrate 20, coating a layer of photoresist on the second metal film, exposing and developing the photoresist with a single tone mask, forming an unexposed area and retaining the photoresist at a position of the pattern of the second electrode, forming a fully exposed area and removing the photoresist at other positions, etching the second metal film at the fully exposed area and stripping the remaining photoresist to form the pattern of the second electrode. As shown in FIGS. 12, 13 and 14, FIG. 12 is a schematic diagram after the pattern of the second electrode is formed according to an exemplary embodiment of the present disclosure, FIG. 13 is a sectional view taken along an A-A direction in FIG. 12, and FIG. 14 is a sectional view taken along a B-B direction in FIG. 12. The second electrode includes the second main electrode 41 and the second side electrode 42. The second main electrode 41 is located on the second planar substrate 21, and the second side electrode 42 is located on the second bending substrate 22. The second side electrode 42 includes the second block electrode 43 and the second strip electrode 44.

(4) Finally, the two first bending substrates 12 in the first substrate 10 are bent to the sides of the first planar substrate 11 along the bending lines to form an upper side and a lower side; and the two second bending substrates 22 in the second substrate 20 are bent to the sides of the second planar substrate 21 along the bending lines to form a left side and a right side, as shown in FIGS. 1, 2 and 3.

From the above description of the embodiment, it can be seen that through a differential design of the first substrate, the second substrate, the first electrode and the second electrode in the embodiments, corner wrinkles caused by the bending can be eliminated, the bending at two adjacent edges, three edges or four edges can be achieved, and the touch effect and reliability of the side areas and the corner areas can be ensured. In the embodiment, the first substrate is designed to be bent in the first (up and down) direction, and the second substrate is designed to be bent in the second (left and right) direction. After the first substrate and the second substrate are stacked to form a touch substrate, a double-layer mutual capacitance structure is formed on the front by the first main electrode and the second main electrode that intersects with each other, and a single-layer mutual capacitance structure is formed on a side by the block electrode and the strip electrode on the side. As a result, no wrinkle is incurred at a corner area formed by two adjacent bending edges, and the bending at two adjacent edges, three edges or four edges can be achieved. The touch effect and reliability of the side areas and the corner areas can be ensured. In addition, the preparation process in the embodiment can be compatible with existing preparation processes well. It has a low production cost, is easy to implement, and has a high production efficiency and a high yield rate. It can also greatly reduce a design complexity and difficulty in the preparation process of the touch substrate, and has good application prospects.

Figure 15:
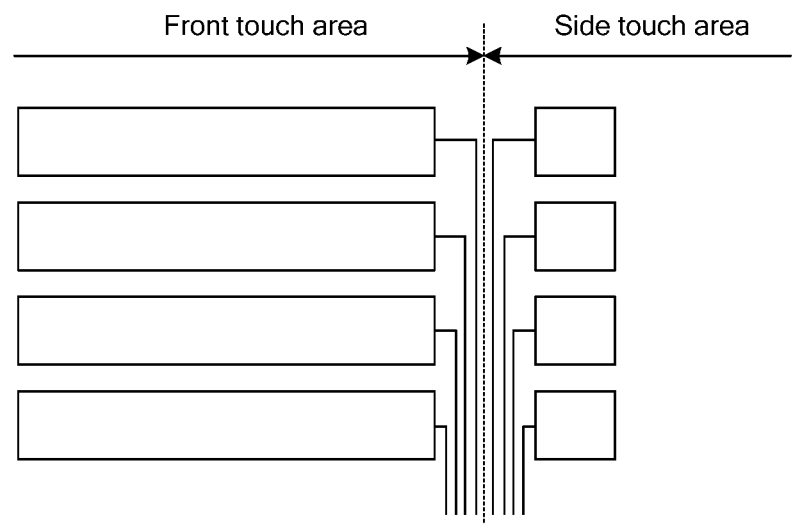
FIG. 15 is a schematic diagram illustrating a structure of block electrodes that are independently wired according to an exemplary embodiment of the present disclosure.

Although the above exemplary embodiments have been described by taking the bending at four edges as an example, those skilled in the art can expand and obtain a plurality of corresponding technical schemes based on this scheme. For example, a scheme of the bending at three edges or two adjacent edges may be obtained, or a corresponding layout may be adjusted. For example, for a scheme that only needs bending at three edges, corresponding electrodes at an unbent edge may be removed in design. In another example, the number of block electrodes disposed on the bending substrate may be appropriately increased or decreased according to actual application requirements. In another example, the block electrodes disposed on the bending substrate may not be connected with the main electrode on the same layer, and may be wired independently, as shown in FIG. 15. FIG. 15 is a schematic diagram of a structure of block electrodes that are independently wired according to an exemplary embodiment of the present disclosure. Although this scheme may increase a design difficulty to a certain extent and may also affect a width of the frame, the number of block electrodes in a side touch area can be adaptively reduced so as to reduce the number of wires, due to a less need for the side touch. In addition, because the front touch area and the side touch area are both wired independently, bad wiring caused by the bending can be reduced greatly, and the touch effect and reliability of the front and side areas can be ensured.

In an exemplary embodiment, a touch display panel is further provided. The touch display panel in the embodiment includes the touch substrate of a previous exemplary embodiment, and further includes a display panel and a cover plate. The touch substrate is disposed on the display panel, and the cover plate is disposed on the touch substrate.

In the embodiment, the touch display panel may be a touch display panel with an ON-Cell structure. The preparation process of the touch display panel in the embodiment includes:

Firstly, a display panel and a touch substrate are prepared respectively. The prepared display panel includes a planar part and bending parts, and the bending parts extend from edges of the planar part and are bent to sides of the planar part. Mature related technologies may be adopted in the preparation process. The touch substrate and the preparation process thereof are already described in details in the aforementioned exemplary embodiments, and will not be repeated here.

Figure 16:
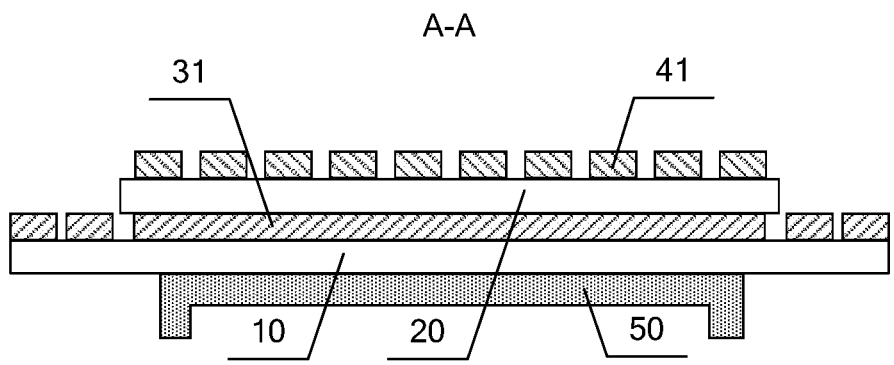
FIGS. 16 and 17 are schematic diagrams of a touch substrate disposed on a display panel according to another exemplary embodiment of the present disclosure.
Figure 17:
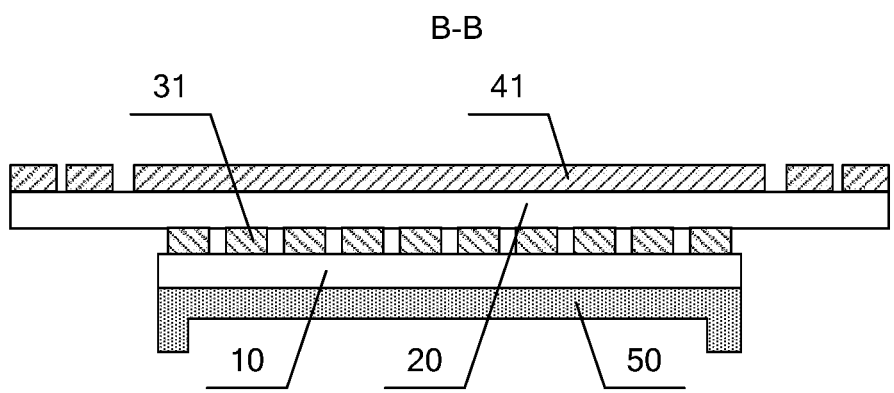

Then, the touch substrate is disposed on the display panel 50. A surface of the first substrate 10 of the touch substrate that is away from a side of the second substrate 20 is attached to a planar part of the display panel 50, as shown in FIGS. 16 and 17. FIG. 16 is a sectional view taken along an A-A direction, and FIG. 17 is a sectional view taken along a B-B direction.

Figure 18:
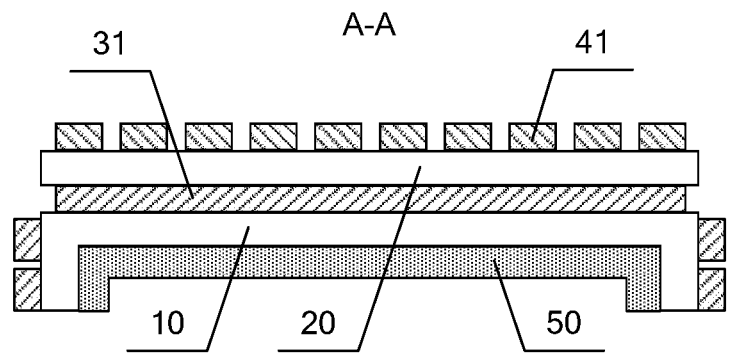
FIGS. 18 and 19 are schematic diagrams of a touch substrate bent to sides according to another exemplary embodiment of the present disclosure.
Figure 19:
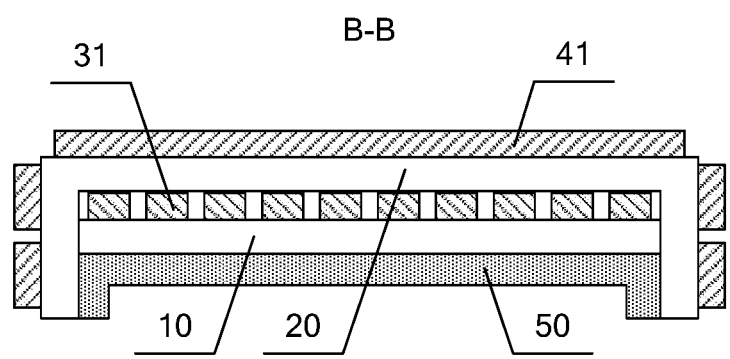

Then, the two first bending substrates in the first substrate 10 are bent to the sides along the bending lines, and are attached to bending parts of the display panel; and the two second bending substrates in the second substrate 20 are bent to the sides along the bending lines, and are attached to bending parts of the display panel, as shown in FIGS. 18 and 19. FIG. 18 is a sectional view taken along an A-A direction, and FIG. 19 is a sectional view taken along a B-B direction.

Figure 20:
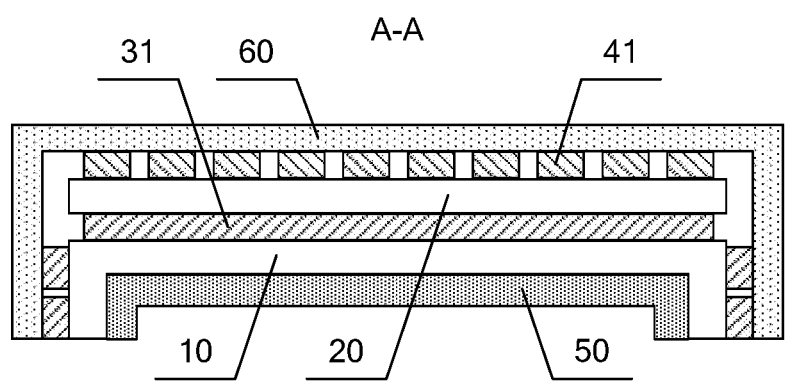
FIGS. 20 and 21 are schematic diagrams of a cover panel placed on a touch substrate according to another exemplary embodiment of the present disclosure.
Figure 21:
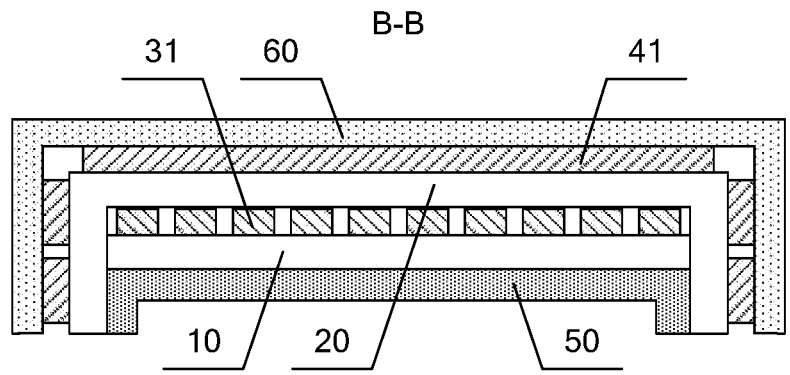

Finally, the cover plate 60 is placed on the touch substrate, and the preparation of the touch display panel with an ON-Cell structure in the embodiment is completed, as shown in FIGS. 20 and 21. FIG. 20 is a sectional view taken along an A-A direction, and FIG. 21 is a sectional view taken along a B-B direction.

In an exemplary embodiment, a touch display panel is further provided. The touch display panel in the embodiment includes the touch substrate in a previous exemplary embodiment, and further includes a display panel and an encapsulation layer. The touch substrate is disposed inside the display panel, and the encapsulation layer is disposed on the touch substrate.

In the embodiment, the touch display panel is a touch display panel with an IN-Cell structure. The preparation process of the touch display panel in the embodiment includes:

First, a display structure layer 70 of the display panel is prepared. The prepared display structure layer 70 is in an unbent state. Mature related technologies may be adopted in the preparation process, which will not be repeated here.

Figure 22:
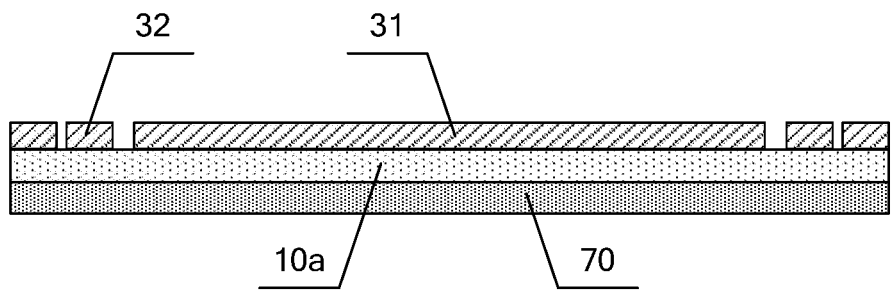
FIG. 22 is a schematic diagram of a first electrode formed on a first insulating layer according to yet another exemplary embodiment of the present disclosure.
Figure 23:
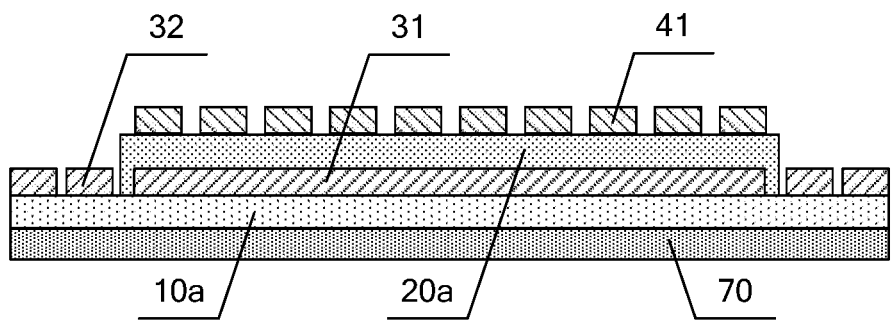
FIG. 23 is a schematic diagram of a second electrode formed on a second insulating layer according to yet another exemplary embodiment of the present disclosure.

Then, a touch substrate is prepared on the display structure layer 70. The structure and preparation process of the touch substrate may adopt the preparation method introduced in an aforementioned exemplary embodiment, except that the first substrate 10 is changed into a first insulating layer 10*a* disposed on the display structure layer 70, and the second substrate 20 is changed into a second insulating layer 20*a* disposed on the first electrode. For example, at first, the first insulating layer 10*a* is formed on the display structure layer 70 in the display panel, and then, the first electrode including the first main electrode 31 and the first side electrode 32 is formed on the first insulating layer 10*a*, as shown in FIG. 22. Then, the second insulating layer 20*a* covering the first electrode is formed, and the second electrode including the second main electrode 41 and the second side electrode 42 is formed on the second insulating layer 20*a*, as shown in FIG. 23. Subsequently, an encapsulation layer 80 covering the first electrode and the second electrode is formed, as shown in FIG. 24. Finally, the touch substrate and the display panel are bent to the sides along the bending lines, and the preparation of the touch display panel with an IN-Cell structure in the embodiment is completed.

In the above exemplary embodiment of the touch display panel, through a differential design of the first substrate and the second substrate, corner wrinkles caused by the bending at corner areas can be eliminated, a close attachment between the touch substrate and the cover plate can be ensured, and a packaging quality and effect can be improved. The display panel may be a Liquid Crystal Display (LCD) or an Organic Light Emitting Diode (OLED) panel, which is not limited by this disclosure. The formed touch display panel may be any product or component with a display function such as a mobile phone, a tablet computer, a television, a display device, a notebook computer, a digital photo frame, or a navigator, etc.

In an exemplary embodiment, a preparation method of a touch substrate is further provided. The preparation method of the touch substrate in the embodiment, as shown in FIG. 25, includes step S1:

S1, forming a planar part and at least a bending part, and bending the bending part from an edge of the planar part to a side of the planar part.

The planar part is formed with a main touch module having a double-layer electrode structure, and the bending part is formed with a side touch module having a single-layer electrode structure.

In an exemplary embodiment, as shown in FIG. 26, step S1 may include step S11 and step S12:

S11, forming the planar part, and forming one or two first bending parts at edges of the planar part in a first direction, and/or forming one or two second bending parts at edges of the planar part in a second direction, wherein the first direction and the second direction are perpendicular to each other; for example, forming the planar part and the first bending part, or forming the planar part and the second bending part, or forming the planar part, the first bending part and the second bending part, wherein there is one or two first bending parts, located at an edge(s) of the planar part in the first direction, and there is one or two second bending parts, located at an edge(s) of the planar part in the second direction; and S12: bending the first bending part and/or the second bending part from the edge of the planar part to the side of the planar part.

Figure 27:
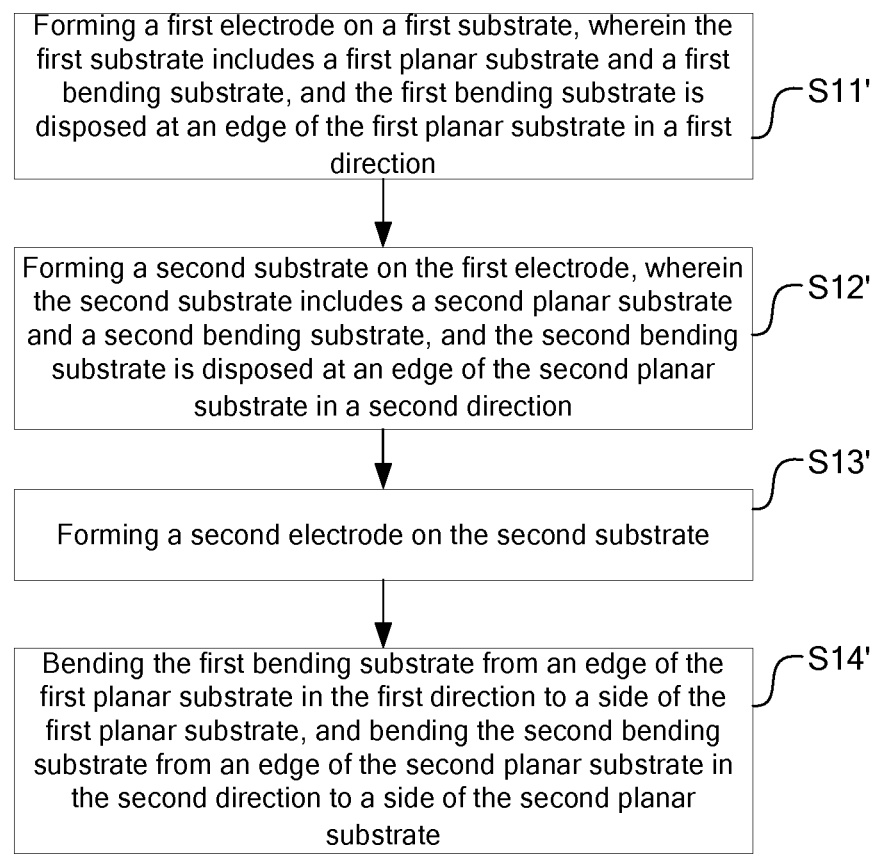
FIG. 27 is a flowchart illustrating another implementation of the step S1 in the preparation method of the touch substrate according to an exemplary embodiment of the present disclosure.

In another exemplary embodiment, as shown in FIG. 27, step S1 may include:

S11', forming a first electrode on a first substrate, wherein the first substrate includes a first planar substrate and a first bending substrate, and the first bending substrate is disposed at an edge of the first planar substrate in a first direction;

S12', forming a second substrate on the first electrode, wherein the second substrate includes a second planar substrate and a second bending substrate, the second bending substrate is disposed at an edge of the second planar substrate in a second direction, and the first direction and the second direction are perpendicular to each other;

S13', forming a second electrode on the second substrate; and

S14', bending the first bending substrate from the edge of the first planar substrate in the first direction to a side of the first planar substrate, and bending the second bending substrate from the edge of the second planar substrate in the second direction to a side of the second planar substrate.

In an exemplary embodiment, forming the first electrode on the first substrate includes: forming a first main electrode on the first planar substrate, and forming a first side electrode on the first bending substrate.

The first main electrode includes a plurality of strip electrodes extending along the first direction. The plurality of strip electrodes are sequentially disposed at intervals along the second direction, and serve as sensing electrodes of the main touch module for a front touch. The first side electrode includes a first strip electrode extending along the second direction and a plurality of first block electrodes sequentially disposed at intervals along the second direction. The plurality of first block electrodes serve as sensing electrodes of the side touch module for a side touch, and the first strip electrode serves as a driving electrode of the side touch module for the side touch.

In an exemplary embodiment, forming the second electrode on the second substrate includes: forming a second main electrode on the second planar substrate, and forming a second side electrode on the second bending substrate.

The second main electrode includes a plurality of strip electrodes extending along the second direction. The plurality of strip electrodes are sequentially disposed at intervals along the first direction, and serve as driving electrodes of the main touch module for the front touch. The second side electrode includes a second strip electrode extending along the first direction and a plurality of second block electrodes sequentially disposed at intervals along the first direction. The plurality of second block electrodes serve as driving electrodes of the side touch module for the side touch, and the second strip electrode serves as a sensing electrode of the side touch module for the side touch.

In the embodiment, the structures of the various film layers mentioned above and the detailed preparation process thereof have been described in the above embodiments, and will not be repeated here.

According to the preparation method of the touch substrate provided by the embodiments of the present disclosure, the touch module adopts a combined electrode structure including a double-layer electrode structure and a single-layer electrode structure. That is, the main touch module of the planar part adopts a double-layer electrode structure, and the side touch module of the bending part adopts a single-layer electrode structure. Corner wrinkles caused by the bending can be eliminated; the bending at two adjacent edges, three edges or four edges can be achieved; and the touch effect and reliability at the corner areas can be ensured. In addition, the preparation process of the embodiment can be compatible with the existing preparation processes well. It has a low production cost, is easy to implement, and has a high production efficiency and a high yield rate. It can greatly reduce the design complexity and difficulty in the preparation process of the touch substrate, and has good application prospects.

Figure 28:
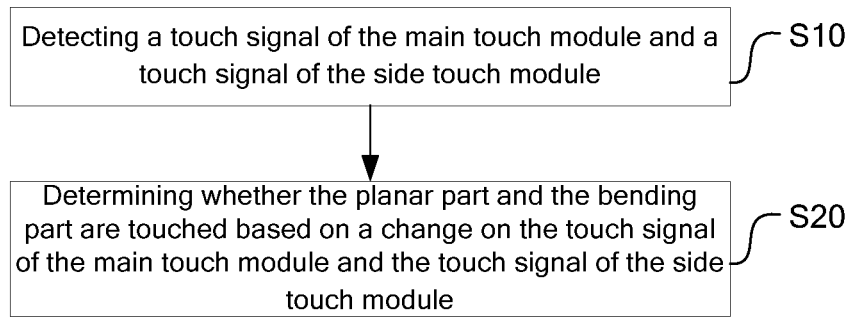
FIG. 28 is a flowchart of a driving method of a touch substrate according to an exemplary embodiment of the present disclosure.

In an exemplary embodiment, a driving method of a touch substrate is further provided. The touch substrate of the embodiment adopts the touch substrate of a previous embodiment. The touch substrate includes a planar part and at least a bending part. The bending part extends from an edge of the planar part and is bent to a side of the planar part. The planar part is formed with a main touch module having a double-layer electrode structure, and the bending part is formed with a side touch module having a single-layer electrode structure. As shown in FIG. 28, the driving method of the touch substrate in the embodiment includes steps S10 and S20.

S10, detecting a touch signal of the main touch module and a touch signal of the side touch module;

S20, determining whether the planar part and the bending part are touched based on a change on the touch signal of the main touch module and the touch signal of the side touch module.

The main touch module includes: a main sensing electrode disposed on a first planar substrate; and a main driving electrode disposed on a second planar substrate.

The side touch module includes: an upper first side electrode and a lower first side electrode disposed on a first bending substrate; and a left second side electrode and a right second side electrode disposed on a second bending substrate.

The first bending substrate extends from an upper edge of the first planar substrate and is bent to an upper side of the first planar substrate, and extends from a lower edge of the first planar substrate and is bent to a lower side of the first planar substrate. The second bending substrate extends from a left edge of the second planar substrate and is bent to a left side of the second planar substrate, and extends from a right edge of the second planar substrate and is bent to a right side of the second planar substrate.

The upper first side electrode includes an upper sensing electrode and an upper driving electrode, and the upper sensing electrode is connected with the main sensing electrode. The lower first side electrode includes a lower sensing electrode and a lower driving electrode, and the lower sensing electrode is connected with the main sensing electrode. The left second side electrode includes a left driving electrode and a left sensing electrode, and the left driving electrode is connected with the main driving electrode. The right second side electrode includes a right driving electrode and a right sensing electrode, and the right driving electrode is connected with the main driving electrode.

In an exemplary embodiment, the step S10 includes: detecting a sensing signal Rx of the main sensing electrode, a driving signal Tx of the main driving electrode, an upper driving signal Tu of the upper driving electrode, a lower driving signal Td of the lower driving electrode, a left sensing signal Rl of the left sensing electrode and a right sensing signal Rr of the right sensing electrode.

In an exemplary embodiment, the step S20 includes: in response to detecting that the sensing signal Rx and the driving signal Tx are changed while the upper driving signal Tu, the lower driving signal Td, the left sensing signal Rl and the right sensing signal Rr are not changed, determining that the planar part is touched;

in response to detecting that the driving signal Tx and the left sensing signal Rl are changed while the sensing signal Rx is not changed, determining that the bending part on the left side of the planar part is touched;

in response to detecting that the driving signal Tx and the right sensing signal Rr are changed while the sensing signal Rx is not changed, determining that the bending part on the right side of the planar part is touched;

in response to detecting that the sensing signal Rx and the upper driving signal Tu are changed while the driving signal Tx is not changed, determining that the bending part on the upper side of the planar part is touched;

in response to detecting that the sensing signal Rx and the lower driving signal Td are changed while the driving signal Tx is not changed, determining that the bending part on the lower side of the planar part is touched; and in response to detecting that the sensing signal Rx, the driving signal Tx, the upper driving signal Tu, the lower driving signal Td, the left sensing signal Rl and the right sensing signal Rr are all changed, determining that the planar part and the bending part on all sides are touched.

In the description of the embodiments of the present disclosure, it needs be understood that, an orientation or position relationship indicated by terms "middle", "upper", "lower", "front", "rear", "vertical", "horizontal", "top", "bottom", "inside", "outside", or the like is based on the orientation or position relationship shown in the drawings, and this is only for ease of description of the present disclosure and simplification of the description, rather than indicating or implying that the referred apparatus or element must have a specific orientation, or be constructed and operated in a particular orientation, and therefore this cannot be understood as a limitation on the present disclosure.

In the description of the embodiments of the present disclosure, unless otherwise clearly specified and defined, the terms "install", "couple", "connect" should be broadly interpreted, for example, it may be a fixed connection, or a detachable connection, or an integrated connection; it may be a mechanical connection or an electrical connection; it may be a direct connection, or may be an indirect connection through an intermediary, or may be an internal connection between two elements. Those of ordinary skill in the art can understand the specific meanings of the above mentioned terms in the present disclosure according to specific situations.

Although implementations disclosed in the present disclosure are as the above, the described contents are only implementations used for facilitating understanding the present disclosure, and are not used to limit the present disclosure. Any person skilled in the art to which the present disclosure pertains may make any modifications and variations in the form and details of implementation without

What we claim is:

1. A touch substrate, comprising a planar part and at least a bending part, wherein the bending part extends from an edge of the planar part and is bent to a side of the planar part, the planar part is provided with a main touch module having a double-layer electrode structure, and the bending part is provided with a side touch module having a single-layer electrode structure, wherein the main touch module comprises a first planar substrate, a first main electrode disposed on the first planar substrate, a second planar substrate disposed on the first main electrode and a second main electrode disposed on the second planar substrate; the first main electrode comprises a plurality of strip electrodes extending along a first direction, and the plurality of strip electrodes are sequentially disposed at intervals along a second direction; and the second main electrode comprises a plurality of strip electrodes extending along the second direction, the plurality of strip electrodes are sequentially disposed at intervals along the first direction, and the first direction and the second direction are perpendicular to each other, wherein the side touch module comprises a first bending substrate and a first side electrode disposed on the first bending substrate; the first bending substrate is disposed at an edge of the first planar substrate in the first direction and is bent to a side of the first planar substrate; and the first side electrode comprises a first strip electrode extending along the second direction and a plurality of first block electrodes sequentially disposed at intervals along the second direction, wherein the first main electrode serves as a sensing electrode for a front touch, the plurality of first block electrodes of the first side electrode serve as sensing electrodes for a side touch, and the first strip electrode of the first side electrode serves as a driving electrode for the side touch, wherein the touch substrate is configured to detect a touch signal of the main touch module and a touch signal of the side touch module;

determine whether the planar part and the bending part are touched based on a change on the touch signal of the main touch module and the touch signal of the side touch module;

detect a sensing signal Rx of the main sensing electrode, a driving signal Tx of the main driving electrode, an upper driving signal Tu of the upper driving electrode, a lower driving signal Td of the lower driving electrode, a left sensing signal Rl of the left sensing electrode and a right sensing signal Rr of the right sensing electrode;

determine that the planar part is touched, in response to detecting that the sensing signal Rx and the driving signal Tx are changed while the upper driving signal Tu, the lower driving signal Td, the left sensing signal Rl and the right sensing signal Rr are not changed;

determine that the bending part on a left side of the planar part is touched, in response to detecting that the driving signal Tx and the left sensing signal Rl are changed while the sensing signal Rx is not changed;

determine that the bending part on a right side of the planar part is touched, in response to detecting that the driving signal Tx and the right sensing signal Rr are changed while the sensing signal Rx is not changed;

determine that the bending part on an upper side of the planar part is touched, in response to detecting that the sensing signal Rx and the upper driving signal Tu are changed while the driving signal Tx is not changed;

determine that the bending part on a lower side of the planar part is touched, in response to detecting that the sensing signal Rx and the lower driving signal Td are changed while the driving signal Tx is not changed; and determine that the planar part and the bending part on all sides are touched, in response to detecting that the sensing signal Rx, the driving signal Tx, the upper driving signal Tu, the lower driving signal Td, the left sensing signal Rl and the right sensing signal Rr are changed.

2. The touch substrate according to claim 1, wherein the bending part comprises one or two first bending parts in a first direction and/or one or two second bending parts in a second direction, and the first direction and the second direction are perpendicular to each other.

3. The touch substrate according to claim 1, wherein: the side touch module comprises a second bending substrate and a second side electrode disposed on the second bending substrate; the second bending substrate is disposed at an edge of the second planar substrate in the second direction and bent to a side of the second planar substrate; and the second side electrode comprises a second strip electrode extending along the first direction and a plurality of second block electrodes sequentially disposed at intervals along the first direction.

4. The touch substrate according to claim 3, wherein the second main electrode serves as a driving electrode for the front touch, the plurality of second block electrodes of the second side electrode serve as driving electrodes for a side touch, and the second strip electrode of the second side electrode serves as a sensing electrode for the side touch.

5. A touch display device comprising a display panel and the touch substrate according to claim 1, wherein the touch substrate is disposed on the display panel, or the touch substrate is disposed in the display panel.

6. A preparation method of a touch substrate, comprising:
forming a planar part and at least a bending part, and bending the bending part from an edge of the planar part to a side of the planar part, wherein the planar part is provided with a main touch module having a double-layer electrode structure, and the bending part is provided with a side touch module having a single-layer electrode structure, wherein forming the planar part and at least the bending part, and bending the bending part from the edge of the planar part to the side of the planar part, comprises:

forming a first electrode on a first substrate, wherein the first substrate comprises a first planar substrate and a first bending substrate, and the first bending substrate is disposed at an edge of the first planar substrate in a first direction;

forming a second substrate on the first electrode, wherein the second substrate comprises a second planar substrate and a second bending substrate, the second bending substrate is disposed at an edge of the second planar substrate in a second direction, and the first direction and the second direction are perpendicular to each other;

forming a second electrode on the second substrate; and bending the first bending substrate from the edge of the first planar substrate in the first direction to a side of the first planar substrate, and bending the second bending substrate from the edge of the second planar substrate in the second direction to a side of the second planar substrate, wherein forming the first electrode on the first substrate comprises:

forming a first main electrode on the first planar substrate, and forming a first side electrode on the first bending substrate, wherein the first main electrode comprises a plurality of strip electrodes extending along the first direction, the plurality of strip electrodes are sequentially disposed at intervals along the second direction and serve as sensing electrodes of the main touch module for a front touch, the first side electrode comprises a first strip electrode extending along the second direction and a plurality of first block electrodes sequentially disposed at intervals along the second direction, the plurality of first block electrodes serve as sensing electrodes of the side touch module for a side touch, and the first strip electrode serves a driving electrode of the side touch module for the side touch, wherein the touch substrate is configured to detect a touch signal of the main touch module and a touch signal of the side touch module;

determine whether the planar part and the bending part are touched based on a change on the touch signal of the main touch module and the touch signal of the side touch module;

detect a sensing signal Rx of the main sensing electrode, a driving signal Tx of the main driving electrode, an upper driving signal Tu of the upper driving electrode, a lower driving signal Td of the lower driving electrode, a left sensing signal R1 of the left sensing electrode and a right sensing signal Rr of the right sensing electrode;

determine that the planar part is touched, in response to detecting that the sensing signal Rx and the driving signal Tx are changed while the upper driving signal Tu, the lower driving signal Td, the left sensing signal R1 and the right sensing signal Rr are not changed;

determine that the bending part on a left side of the planar part is touched, in response to detecting that the driving signal Tx and the left sensing signal R1 are changed while the sensing signal Rx is not changed;

determine that the bending part on a right side of the planar part is touched, in response to detecting that the driving signal Tx and the right sensing signal Rr are changed while the sensing signal Rx is not changed;

determine that the bending part on an upper side of the planar part is touched, in response to detecting that the sensing signal Rx and the upper driving signal Tu are changed while the driving signal Tx is not changed;

determine that the bending part on a lower side of the planar part is touched, in response to detecting that the sensing signal Rx and the lower driving signal Td are changed while the driving signal Tx is not changed; and determine that the planar part and the bending part on all sides are touched, in response to detecting that the sensing signal Rx, the driving signal Tx, the upper driving signal Tu, the lower driving signal Td, the left sensing signal R1 and the right sensing signal Rr are changed.

7. The preparation method of the touch substrate according to claim 6, wherein forming the planar part and at least the bending part, and bending the bending part from the edge of the planar part to the side of the planar part, comprises:

forming the planar part and a first bending part, or forming the planar part and a second bending part, or forming the planar part, the first bending part and the second bending part, wherein there is one or two first bending parts, located at one or two edges of the planar part in a first direction, there is one or two second bending parts, located at one or two edges of the planar part in a second direction, and the first direction and the second direction are perpendicular to each other; and bending the first bending part and/or the second bending part from the edge of the planar part to the side of the planar part.

8. The preparation method of the touch substrate according to claim 6, wherein forming the second electrode on the second substrate comprises:

forming a second main electrode on the second planar substrate, and forming a second side electrode on the second bending substrate, wherein the second main electrode comprises a plurality of strip electrodes extending along the second direction, the plurality of strip electrodes are sequentially disposed at intervals along the first direction and serve as driving electrodes of the main touch module for a front touch, the second side electrode comprises a second strip electrode extending along the first direction and a plurality of second block electrodes sequentially disposed at intervals along the first direction, the plurality of second block electrodes serve as driving electrodes of the side touch module for a side touch, and the second strip electrode serves as a sensing electrode of the side touch module for the side touch.

9. A driving method of a touch substrate, wherein the touch substrate comprises a planar part and at least a bending part, the bending part extends from an edge of the planar part and is bent to a side of the planar part, the planar part is provided with a main touch module having a double-layer electrode structure, and the bending part is provided with a side touch module having a single-layer electrode structure, the driving method comprising:

detecting a touch signal of the main touch module and a touch signal of the side touch module; and determining whether the planar part and the bending part are touched based on a change on the touch signal of the main touch module and the touch signal of the side touch module, wherein the main touch module comprises a main sensing electrode disposed on a first planar substrate and a main driving electrode disposed on a second planar substrate; the side touch module comprises an upper first side electrode and a lower first side electrode disposed on a first bending substrate and a left second side electrode and a right second side electrode disposed on a second bending substrate; the first bending substrate extends from an upper edge of the first planar substrate and is bent to an upper side of the first planar substrate, and extends from a lower edge of the first planar substrate and is bent to a lower side of the first planar substrate; the second bending substrate extends from a left edge of the second planar substrate and is bent to a left side of the second planar substrate, and extends from a right edge of the second planar substrate and is bent to a right side of the second planar substrate; the upper first side electrode comprises an upper sensing electrode and an upper driving electrode, and the upper sensing electrode is connected with the main sensing electrode; the lower first side electrode comprises a lower sensing electrode and a lower driving electrode, and the lower sensing electrode is connected with the main sensing electrode; the left second side electrode comprises a left driving electrode and a left sensing electrode, and the left driving electrode is connected with the main driving electrode; and the right second side electrode comprises a right driving electrode and a right sensing electrode, and the right driving electrode is connected with the main driving electrode, wherein detecting the touch signal of the main touch module and the touch signal of the side touch module comprises:

detecting a sensing signal Rx of the main sensing electrode, a driving signal Tx of the main driving electrode, an upper driving signal Tu of the upper driving electrode, a lower driving signal Td of the lower driving electrode, a left sensing signal Rl of the left sensing electrode and a right sensing signal Rr of the right sensing electrode, wherein determining whether the planar part and the bending part are touched based on the change on the touch signal of the main touch module and the touch signal of the side touch module comprises:

in response to detecting that the sensing signal Rx and the driving signal Tx are changed while the upper driving signal Tu, the lower driving signal Td, the left sensing signal Rl and the right sensing signal Rr are not changed, determining that the planar part is touched;

in response to detecting that the driving signal Tx and the left sensing signal Rl are changed while the sensing signal Rx is not changed, determining that the bending part on a left side of the planar part is touched;

in response to detecting that the driving signal Tx and the right sensing signal Rr are changed while the sensing signal Rx is not changed, determining that the bending part on a right side of the planar part is touched;

in response to detecting that the sensing signal Rx and the upper driving signal Tu are changed while the driving signal Tx is not changed, determining that the bending part on an upper side of the planar part is touched;

in response to detecting that the sensing signal Rx and the lower driving signal Td are changed while the driving signal Tx is not changed, determining that the bending part on a lower side of the planar part is touched; and in response to detecting that the sensing signal Rx, the driving signal Tx, the upper driving signal Tu, the lower driving signal Td, the left sensing signal Rl and the right sensing signal Rr are changed, determining that the planar part and the bending part on all sides are touched.

* * * * *